Dec. 11, 1934.   H. D. WAKEFIELD   1,983,956
TRELLIS
Filed July 14, 1934
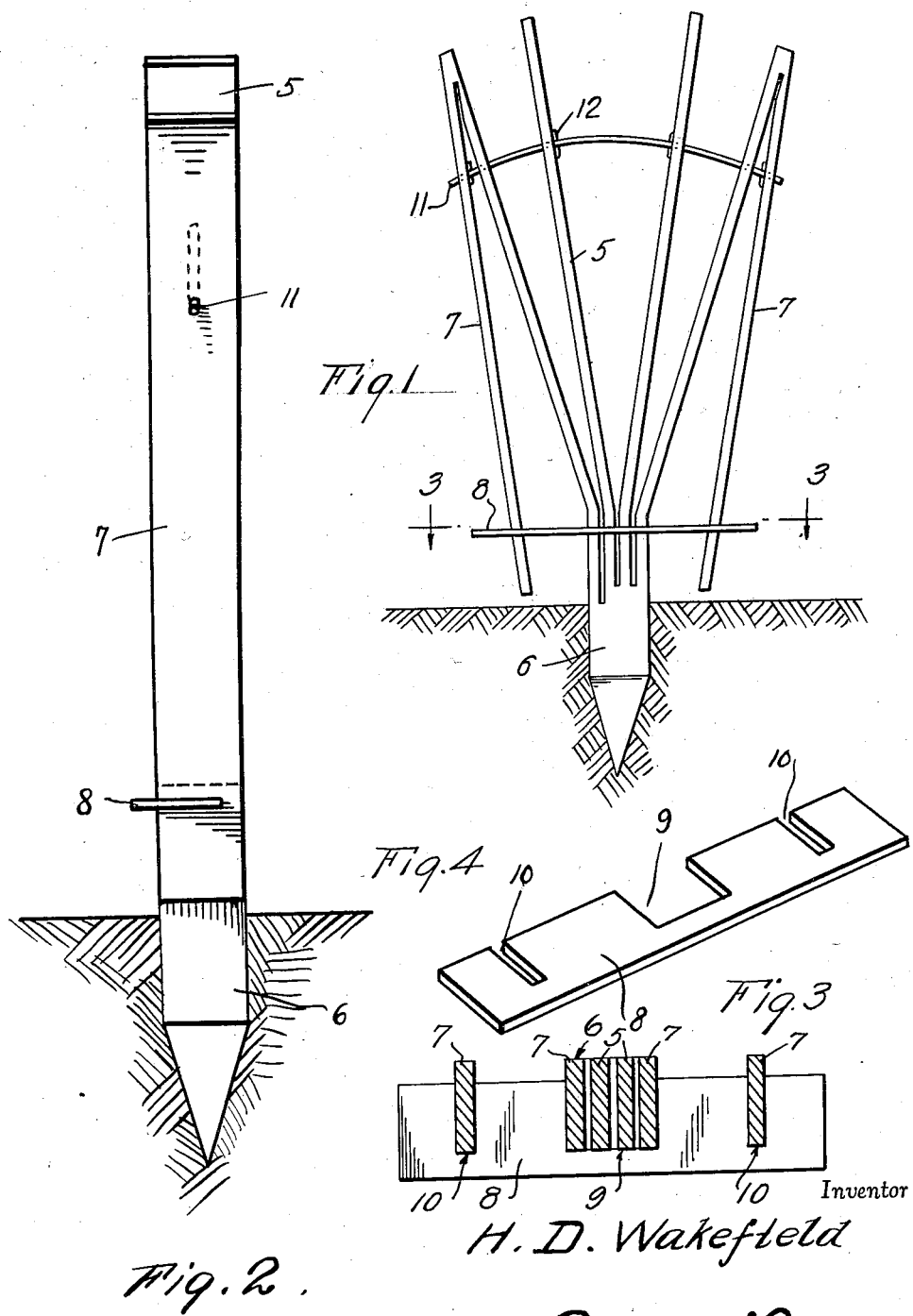
Inventor
H. D. Wakefield
By Clarence A. O'Brien
Attorney Patented Dec. 11, 1934

1,983,956

UNITED STATES PATENT OFFICE 1,983,956

TRELLIS

Howard D. Wakefield, Warren, Vt.

Application July 14, 1934, Serial No. 735,231

1 Claim. (Cl. 47—47)

The present invention relates to a trellis designed for use in gardens and on which may climb roses and other vine plants.

The object of the invention resides in the provision of a trellis of this nature which is strong, can be constructed of cheap timber, costs but little to manufacture, less top heavy than the average trellis, constructed so that the plant may catch the trellis without aid, will not warp, will not blow over as easy as other trellises and can be assembled quickly.

With the above and numerous other objects in view as will appear as the description proceeds, the invention consists in certain novel features of construction, and in the combination and arrangement of parts as will hereinafter be more fully described and claimed.

In the drawing:

Fig. 1 is a front elevation of a trellis embodying the features of my invention, Fig. 2 is a side elevation thereof, Fig. 3 is a horizontal sectional view taken on the line 3—3 of Fig. 1, and Fig. 4 is a perspective view of the bottom cross bar.

Referring to the drawing in detail, it will be seen that this trellis is made of wood, in any size, from lumber that is sawed nearly square, ranging in different sizes to suit the demand. The stick is sawed from the bottom end lengthwise into three or more scarfs 5 leaving a bottom peg 6. Then the two outside scarfs are sawed from the point upwardly to the top into one or more scarfs 7. The lower ends of these scarfs 7 are sawed so that they will terminate above the ground when the peg portion 6 is in the ground as shown in Fig. 1.

The numeral 8 denotes a bottom cross-bar sawed from flat lumber which has three cut-outs 9 and 10—10. The cut-out 9 receives the peg immediately above the lower ends of the scarfs 5 and the cut-outs 10 receive the end scarfs 7.

Numeral 11 denotes a round dowel which is used to spread the top of the trellis to any desired width by means of cotter pins 12.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim is:

A trellis of the class described including a peg having rising therefrom in diverging relationship a plurality of scarfs, the end ones of which are provided with depending scarfs terminating a distance above the lower end and a brace on the lower part of said trellis adjacent the peg portion, said brace having slots adjacent the ends thereof for the insertion of the depending scarfs and a centrally disposed slot for the insertion of the upstanding scarfs.

HOWARD D. WAKEFIELD.